US012803815B2

(12) United States Patent
Wu et al.

(10) Patent No.: US 12,803,815 B2
(45) Date of Patent: Nov. 17, 2026

(54) METHOD FOR PROTECTING A CRYPTOGRAPHIC SECURE OBJECT AT A HYBRID SECURITY LEVEL

(71) Applicant: Fort Robotics, Inc., Philadelphia, PA (US)

(72) Inventors: Guang Wu, San Jose, CA (US); Nathan Bivans, Cinnaminson, NJ (US)

(73) Assignee: Fort Robotics, Inc., Philadelphia, PA (US)

( * ) Notice: Subject to any disclaimer, the term of this patent is extended or adjusted under 35 U.S.C. 154(b) by 0 days.

(21) Appl. No.: 18/925,871

(22) Filed: Oct. 24, 2024

(65) Prior Publication Data

US 2025/0055703 A1 Feb. 13, 2025

Related U.S. Application Data

(63) Continuation-in-part of application No. 18/373,152, filed on Sep. 26, 2023, now Pat. No. 12,284,275.

(60) Provisional application No. 63/545,832, filed on Oct. 26, 2023, provisional application No. 63/419,968, filed on Oct. 27, 2022, provisional application No. 63/410,582, filed on Sep. 27, 2022.

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01)

(58) Field of Classification Search
CPC ............................ H04L 9/3247; H04L 9/0825
USPC .......................................................... 713/176
See application file for complete search history.

(56) References Cited

U.S. PATENT DOCUMENTS

| | | | | |
|---|---|---|---|---|
| 9,230,121 | B1 * | 1/2016 | Kelley | G06F 21/602 |
| 2002/0013898 | A1 * | 1/2002 | Sudia | G06Q 20/3829 380/278 |
| 2022/0116229 | A1 * | 4/2022 | Jones | H04L 9/3247 |
| 2022/0329442 | A1 * | 10/2022 | Bulusu | H04L 63/1416 |
| 2023/0125983 | A1 * | 4/2023 | Baker | G06F 21/602 726/26 |
| 2023/0300124 | A1 * | 9/2023 | Subramanian | H04L 63/0823 726/10 |

* cited by examiner

*Primary Examiner* — Moeen Khan
(74) *Attorney, Agent, or Firm* — Run8 Patent Group, LLC; Peter Miller; Brian T. Chew

(57) ABSTRACT

A method includes: generating a first request to generate a first cryptographic secure object protected at a first security level; transmitting the first request to a first server via a first communication link; generating a second request to generate a second cryptographic secure object associated with the first cryptographic secure object and protected at a second security level falling below the first security level; transmitting the second request to a second server via a second communication link; transmitting a third request to generate a third cryptographic secure object based on the second cryptographic secure object to the second server in response to absence of the first communication link; and executing an action based on the third cryptographic secure object, the third cryptographic secure object generated by the second server based on the first and second cryptographic secure objects and protected at a third security level exceeding the second security level.

20 Claims, 4 Drawing Sheets

METHOD FOR PROTECTING A CRYPTOGRAPHIC SECURE OBJECT AT A HYBRID SECURITY LEVEL

CROSS-REFERENCE TO RELATED APPLICATIONS

This Application is a continuation-in-part of U.S. patent application Ser. No. 18/373,152, filed on 26 Sep. 2023, which claims the benefit of U.S. Provisional Application No. 63/410,582, filed on 27 Sep. 2022, and U.S. Provisional Application No. 63/419,968, filed on 27 Oct. 2022, each of which is incorporated in its entirety by this reference.

This application claims the benefit of U.S. Provisional Application No. 63/545,832, filed on 26 Oct. 2023, which is incorporated in its entirety by this reference.

This Application is related to U.S. patent application Ser. No. 18/136,471, filed on 19 Apr. 2023, which is incorporated in its entirety by this reference.

TECHNICAL FIELD

This invention relates generally to the field of communications security and more specifically to a new and useful method for protecting a cryptographic secure object at a hybrid security level within the field of communications security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1A:
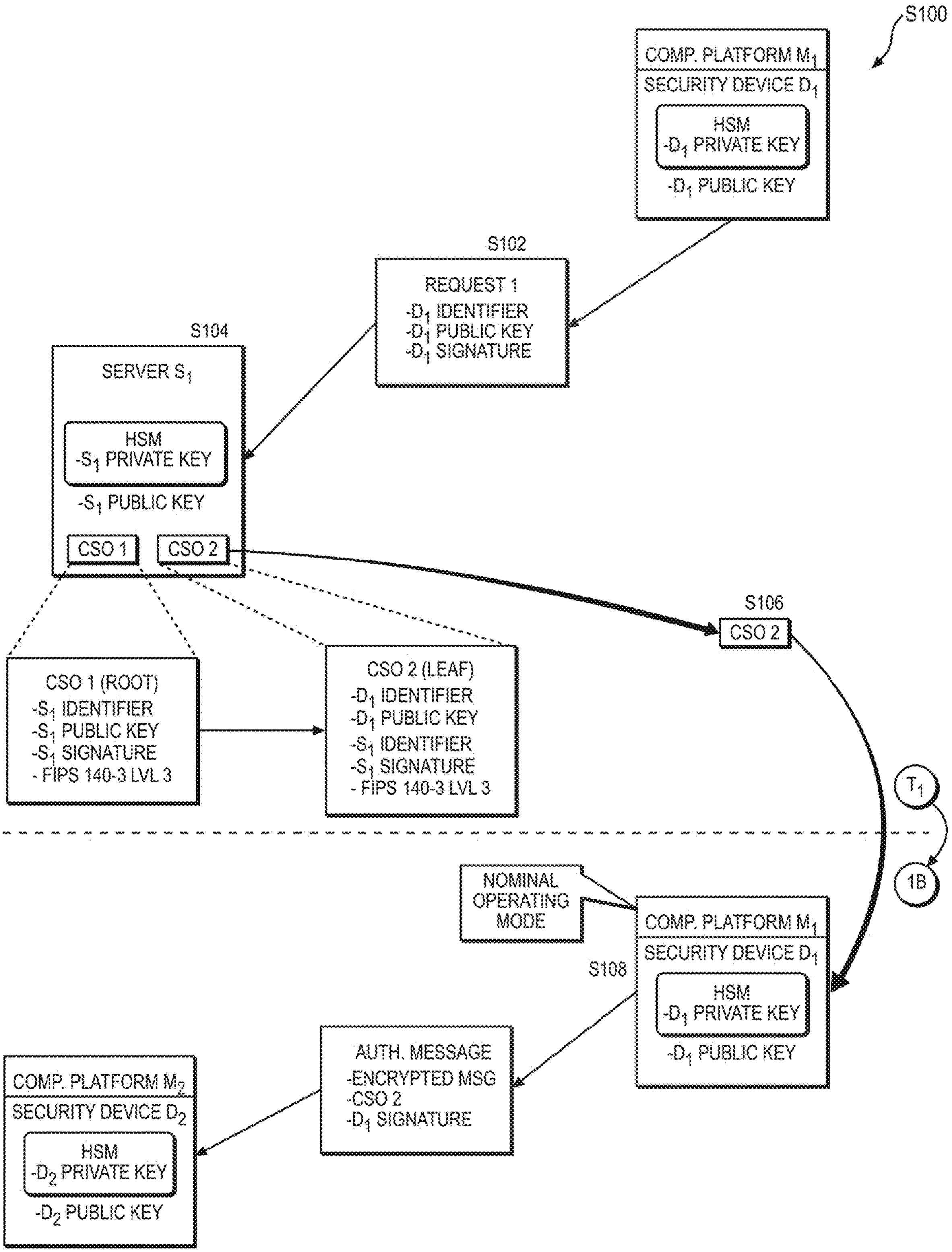
FIGS. 1A, 1B, 1C, and 1D are flowchart representations of a method.
Figure 1B:
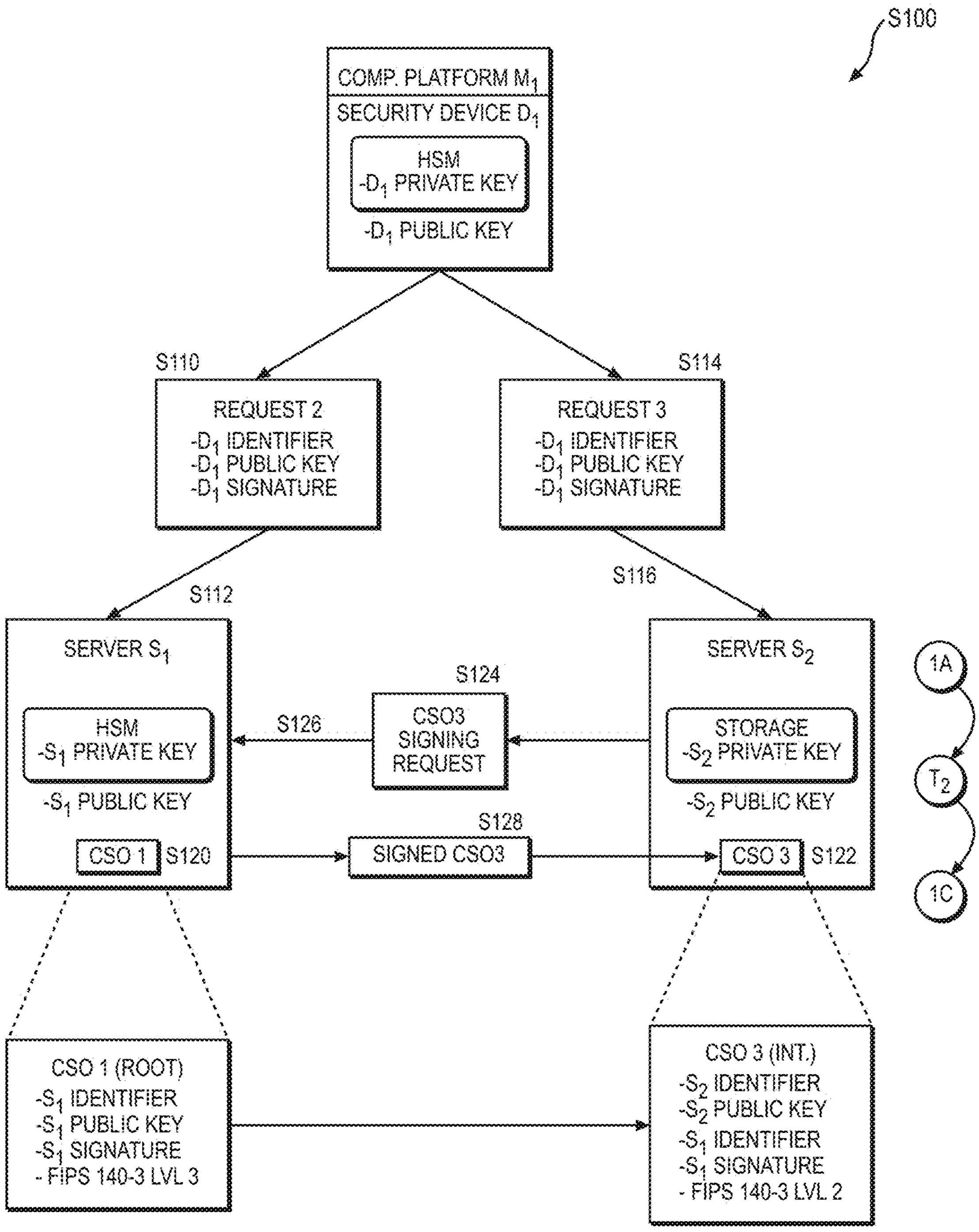
Figure 1C:
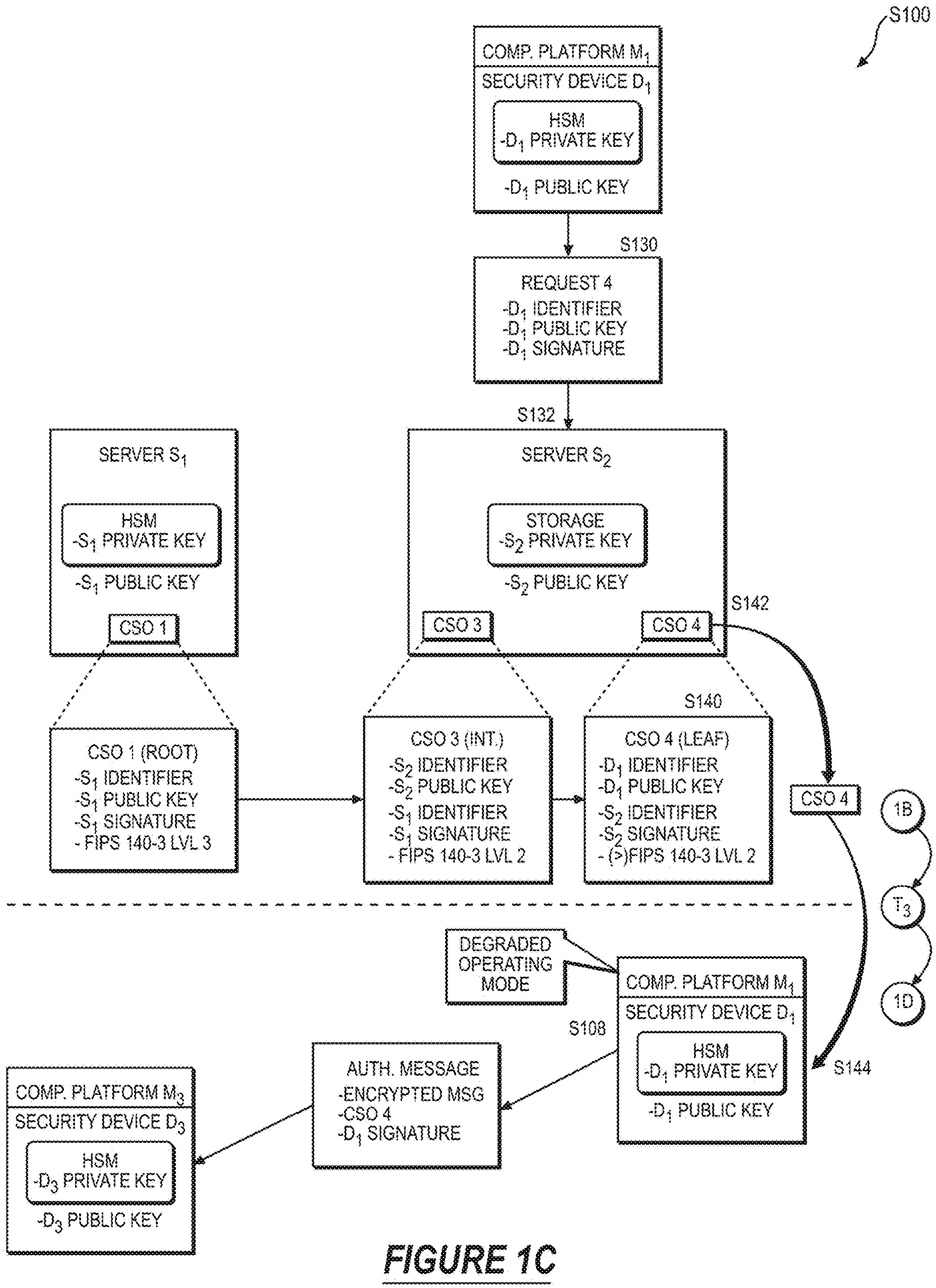

As shown in FIGS. 1A, 1B, and 1C, a method S100 includes, at a security device during a first time period: generating a first request to generate a first cryptographic secure object characterized by a first security level in Block S102; transmitting the first request to a first server via a first communication link in Block S104; receiving the first cryptographic secure object from the first server in Block S106, the first cryptographic secure object characterized by a first signature associated with the first server; and executing a first action based on the first cryptographic secure object in Block S108.

The method S100 also includes, at the security device during a second time period: generating a second request to generate a second cryptographic secure object characterized by the first security level and to digitally sign a third cryptographic secure object characterized by a second security level falling below the first security level in Block S110; transmitting the second request to the first server via the first communication link in Block S112; generating a third request to generate the third cryptographic secure object associated with the second cryptographic secure object in Block S114; and transmitting the third request to a second server via a second communication link in Block S116.

The method S100 further includes, at the security device during a third time period succeeding the second time period: generating a fourth request to generate a fourth cryptographic secure object based on the third cryptographic secure object in Block S130; transmitting the fourth request to the second server via the second communication link in Block S132; and receiving the fourth cryptographic secure object from the second server in Block S144. The fourth cryptographic secure object is: generated by the second server based on the second cryptographic secure object and the third cryptographic secure object; and characterized by a third security level exceeding the second security level.

The method S100 also includes executing a second action based on the fourth cryptographic secure object in Block S108.

1.1 Variation: Level 2 Cryptographic Secure Object Server

As shown in FIGS. 1A, 1B, and 1C, one variation of the method S100 includes, at a security device during a first time period: generating a first request to generate a first cryptographic secure object characterized by a first security level and to digitally sign a second cryptographic secure object characterized by a second security level falling below the first security level in Block S110; transmitting the first request to a first server via a first communication link in Block S112; generating a second request to generate the second cryptographic secure object associated with the first cryptographic secure object in Block S114; and transmitting the second request to a second server via a second communication link in Block S116.

This variation of the method S100 also includes, at the second server during the first time period: generating the second cryptographic secure object characterized by the second security level in Block S122; generating a third request to digitally sign the second cryptographic secure object based on the first cryptographic secure object in Block S124; and transmitting the fourth request to the first server via a second communication link in Block S126.

This variation of the method S100 further includes, at the security device during a second time period succeeding the first time period: generating a fourth request to generate a third cryptographic secure object based on the second cryptographic secure object in Block S130; transmitting the second request to the second server via the second communication link in Block S132; and receiving the third cryptographic secure object from the second server in Block S144. The third cryptographic secure object is: generated by the second server based on the first cryptographic secure object and the second cryptographic secure object; and characterized by a third security level exceeding the second security level.

This variation of the method S100 also includes executing a first action based on the third cryptographic secure object in Block S108.

1.2 Variation: Hybrid Protection for Cryptographic Secure Object

As shown in FIGS. 1A, 1B, and 1C, one variation of the method S100 includes, at a security device during a first time period: generating a first request to generate a first cryptographic secure object protected at a first security level and to digitally sign a second cryptographic secure object protected at a second security level falling below the first security level in Block S110; transmitting the first request to a first server via a first communication link in Block S112; generating a second request to generate the second cryptographic secure object associated with the first cryptographic secure object in Block S114; and transmitting the second request to a second server via a second communication link in Block S116.

This variation of the method S100 also includes, during a second time period succeeding the first time period: generating a third request to generate a third cryptographic secure object based on the second cryptographic secure object in response to absence of the first communication link in Block S130; and transmitting the second request to the second server via the second communication link in Block S132; and receiving the third cryptographic secure object from the second server in Block S144. The third cryptographic secure object is: generated by the second server based on the first cryptographic secure object and the second cryptographic secure object; and protected at a third security level exceeding the second security level.

This variation of the method S100 further includes executing an action based on the third cryptographic secure object in Block S108.

2. Applications

Generally, a computer system (hereinafter "the system")—including a computing platform (e.g., a machine, a robot, an autonomous vehicle), a security device that executes security and functional safety operations for the computing platform, and a server (e.g., a cryptographic secure object server)—can execute Blocks of the method S100: to periodically (e.g., weekly, daily, hourly) generate a new set of cryptographic keys (e.g., an asymmetric key pair for identification, an asymmetric key pair for communication) associated with the security device; to generate a first cryptographic secure object (e.g., a digital certificate) that associates an identity of the security device with the new set of cryptographic keys and verifies—by a trusted source (e.g., the server)—authenticity of the new set of cryptographic keys; and to authenticate the security device based on the new set of cryptographic keys and/or the first cryptographic secure object.

More specifically, the system can execute Blocks of the method S100: to establish a secure network connection (e.g., a virtual private network) between the security device and the server (e.g., a high-security server); to generate the first cryptographic secure object protected at a first security level (e.g., Federal Information Processing Standard (hereinafter "FIPS") 140-2 level 3, FIPS 140-3 level 3); and to authenticate the security device based on the cryptographic secure object protected at this first security level in order to execute high risk operations (e.g., installation of a firmware update on the security device, accepting connection from a remote server, nominal autonomous operation of the computing platform).

Accordingly, the system can execute Blocks of the method S100: to periodically generate new cryptographic keys for the security device; and to generate cryptographic secure objects corresponding to these new cryptographic keys. Therefore, the system can execute Blocks of the method S100 to establish trust in the security device—based on the cryptographic keys and the cryptographic secure object—to engage in secure communication and/or to execute functional safety operations while reducing risk of compromised cryptographic keys.

2.1 Protecting Cryptographic Security Objects at Hybrid Security Levels

However, the system may fail to establish the secure network connection between the security device and the high security server, such as due to unavailability of the virtual private network and/or deployment of the security device and computing platform to an operating zone absent network connectivity. Additionally, the security device authenticated based on a cryptographic secure object—generated by a second server (e.g., a high-availability server)—protected at a second security level (e.g., FIPS 140-2 level 2, FIPS 140-3 level 3) may be restricted from executing the high risk operations due to the second security level falling below a security threshold.

Accordingly, the system—including a set of servers, such as the high-security server and the high—availability server—can execute Blocks of the method S100: to generate a second cryptographic secure object (e.g., a root certificate) protected at the first security level and characterized as a root of trust for the system at the high-security server; and to generate a third cryptographic secure object (e.g., an intermediate certificate) protected at the second security level and linked to the second cryptographic secure object based on a signature of the first server at the high-availability server. The system can then execute Blocks of the method S100: to generate a fourth cryptographic secure object (e.g., a second leaf certificate)—protected at a third security level exceeding the second security level—linked to the second and third cryptographic secure objects based on signatures of the high-security server and the high-availability server in order to enable the security device to execute a subset of the high risk operations (or a subset of the high risk operations at a degraded capacity) based on the fourth cryptographic secure object protected at the third security level exceeding the security threshold.

Therefore, the system can execute Blocks of the method S100 to leverage network availability of the high-availability server with security capability of (and/or trust in) the high-security server to generate a chain of cryptographic secure objects based on which the security device may be authenticated, thereby enabling continuous operation of the security device to engage in secure communication and/or to execute functional safety operations on behalf of the computing platform.

2.2 Example

In one example application, a security device—mounted on an autonomous mining vehicle—deploys in an operating field managed by a zone controller. The security device executes Blocks of the method S100 to authenticate with entities (e.g., the security device, other security devices mounted to other autonomous mining vehicles in the operating field, the zone controller) based on a set of cryptographic keys and/or a cryptographic secure object.

During operation in the operating field, the security device executes Blocks of the method S100 to periodically generate new cryptographic keys. However, because the security device exhibits intermittent network connectivity based on a location of the security device (and the autonomous mining vehicle) within the operating field during operation and may be unable to establish a secure network connection with a high-security server, the security device executes Blocks of the method S100: to establish a communication link with the zone controller; and to request the zone controller to generate a new cryptographic secure object—protected at the second security level—for these new cryptographic keys.

The zone controller—exhibiting stable network connectivity based on its position in the operating field—executes Blocks of the method S100: to establish a secure network connection with the high-security server; and, in cooperation with the high-security server, to generate a chain of cryptographic secure objects including the new cryptographic secure object linked to a cryptographic secure object protected at the first security level.

Accordingly, the system executes Blocks of the method S100: to generate the chain of cryptographic secure objects—absent interruption during operation of the autonomous mining vehicle throughout the operating field—with which to authenticate the security device; and, based on this authentication, to engage in secure communication and/or to execute functional safety operations.

2.3 Variation: Cryptographic Secure Objects for Other Entities

As described herein, a security device executes Blocks of the method S100 to transmit—to a cryptographic secure object server—a request for a cryptographic secure object that verifies authenticity of a newly generated set of cryptographic keys. However, other entities, such as a management server (e.g., a computing device) that manages a population of security devices and/or computing platforms, can similarly execute Blocks of the method S100: to generate a new set of cryptographic keys (e.g., an asymmetric key pair); to generate a request for a cryptographic secure object that verifies authenticity of this newly generated set of cryptographic keys to entities (e.g., security devices, servers, computing platforms); and to transmit the request to the cryptographic secure object server.

3. Terminology

Generally, a "cryptographic key" is referred to herein as information (e.g., a value, a string) that, when processed through a cryptographic algorithm, encodes and/or decodes cryptographic data.

Generally, an "asymmetric key pair" is referred to herein as a pair of cryptographic keys—associated with one entity (e.g., a security device, a computing platform, a server)—including a public key and a private key.

Generally, a "security device" is referred to herein as a computer that executes communications, security, and/or safety functionality on behalf of a computing platform.

Generally, a "computing platform" is referred to herein as an entity (e.g., an autonomous machine, a robot, a vehicle)—to which a security device is coupled—deployed to an operating field to execute a task.

Generally, a "cryptographic secure object server" is referred to herein as a computer that generates, serves, stores, and/or signs cryptographic secure objects for entities (e.g., other servers, communication modules, devices).

Generally, a "cryptographic secure object" is described herein as information (e.g., a digital certificate) that associates a cryptographic key (e.g., a public key) with an entity.

4. System

Generally, the system can include: a computing platform (or a "platform"); a security device communicatively coupled to the computing platform; a first cryptographic secure object server; and a second cryptographic secure object server.

The computing platform and the security device can be communicatively coupled to the first server and/or the second server via a communication network (e.g., a local area network, a wide area network, the Internet).

The system can include additional computing platforms and/or security devices communicatively coupled to the first server and/or the second server via the communication network. More specifically, the system can include a population of entities including a set of computing platforms and a set of security devices, each security device—in the set of security devices—corresponding to (e.g., mounted on) a computing platform in the set of computing platforms.

4.1 Computing Platform

Generally, a computing platform can include a sensor (e.g., radar sensor, LiDAR sensor, ultrasonic sensor, infrared camera), a machine, a robot, a vehicle (e.g., an autonomous vehicle, a semi-autonomous vehicle), a control system, an emergency stop system (e.g., line break sensor, emergency stop button) and/or an industrial system (e.g., manufacturing system, farming system, construction system, power system, transportation system), etc.

4.2 Security Device

Generally, a security device can execute communications, security, and/or safety critical diagnostics and control functions (e.g., on behalf of a computing platform). For example, a security device can include hardware and/or software that meet functional safety standards (e.g., IEC 61508, ISO 13849, ISO 26262).

In one implementation, such as described in U.S. patent application Ser. No. 18/136,471, the security device cooperates with the computing platform: to authenticate the security device based on identify information associated with the security device; to establish a chain of trust that extends to the computing platform; to monitor execution of the computing platform; and to execute an action in response to detecting a violation of a security policy (e.g., issuing a command that transitions the computing platform into a predefined state, such as a safe state).

4.2.1 Machine Identity

Generally, an entity (e.g., a computing platform, a security device) can exhibit (e.g., can be assigned) a machine identity that uniquely identifies the entity in a population of entities. For example, a security device can exhibit a machine identity based on a serial number that uniquely identifies the security device.

In one implementation, an entity exhibits a machine identity based on a set of hardware-specific factors of the entity. In one example, a security device exhibits a first machine identity based on a chip built-in unique identifier—such as a processor unique identifier—associated with a processor (or a controller) of the security device. In another example, a computing platform exhibits a second machine identity based on a network interface hardware address (e.g., a media access controller address or "MAC address") associated with a network interface of the computing platform.

Additionally or alternatively, the entity can exhibit a machine identity based on cryptographic information (e.g., secret keys, symmetric keys, asymmetric key pairs, digital certificates). More specifically, the entity can exhibit the machine identity based on the cryptographic information correlated with the set of hardware-specific factors of the entity.

Accordingly, a particular entity—in a population of entities that may be mass-produced with identical builds—can be uniquely identified based on this unique machine identity. Therefore, the system can ensure that this particular entity includes appropriate firmware, software, configuration information, licenses, permissions, and other information corresponding to its machine identity.

4.2.2 Hardware Security Module

Generally, the security device can include identity information associated with the security device and the computing platform. The security device can authenticate elements of the security device and/or the computing platform based on the identity information.

In one implementation, the security device stores identity information including cryptographic information, such as secret keys, symmetric keys, asymmetric key pairs for device identification, asymmetric key pairs for communication, and/or digital certificates.

In another implementation, the security device stores identity information including a machine identity of the security device and/or a machine identity of a computing platform (e.g., a machine identity of a computing platform corresponding to the security device).

In another implementation, the security device stores the identity information in a hardware security module of the security device. More specifically, the hardware security module can be provisioned (or "pre-provisioned") with the identity information (or a portion of the identity information) prior to deployment and/or runtime of the security device.

4.2.3 Asymmetric Keys

In one implementation, the security device periodically (e.g., every week, every day, every five minutes) generates a new asymmetric key pair including a new public key and a new private key. The security device stores the new private key in the hardware security module of the security device. Therefore, by periodically generating a new asymmetric key pair, the security device can reduce risk and/or impact of a compromised private key.

In another implementation, the security device: generates a request to generate a cryptographic secure object associated with the new public key; and transmits this request to a cryptographic secure object server.

4.3 Cryptographic Secure Object Servers

Generally, the system can include a cryptographic secure object server (hereinafter a "server") configured to generate, store, and/or sign a cryptographic secure object (e.g., a digital certificate).

For example, the server can: receive a public key associated with a security device; and generate a cryptographic secure object associated with the public key and the security device.

More specifically, the server can generate the cryptographic secure object specifying: an identifier associated with an owner of the cryptographic secure object (e.g., an identifier associated with the security device); a public key associated with the owner (e.g., the public key associated with the security device); an identifier associated with an issuer of the cryptographic secure object (e.g., an identifier associated with the server); and a signature associated with the issuer (e.g., a signature associated with the server). The server can store the cryptographic secure object and/or transmit the cryptographic secure object to the security device (and/or another entity).

4.3.1 Level 3 Cryptographic Secure Object Server

In one implementation, the system includes a first cryptographic secure object server (hereinafter the "first server") configured to generate a cryptographic secure object characterized by (e.g., protected at) a first security level (e.g., FIPS 140-2 level 3, FIPS 140-3 level 3). In this implementation, the first server generates a cryptographic secure object characterized by the first security level in response to establishing a communication link—with a security device—based on a first connection type (e.g., a virtual private network connection, a LONG-TERM EVOLUTION (or "LTE") network connection, a WI-FI network connection).

Additionally, the first server can include a hardware security module. The first server can store cryptographic information in a hardware security module of the first server. Based on the hardware security module storing cryptographic information, the first server can generate a cryptographic secure object protected at the first security level.

4.3.2 Level 2 Cryptographic Secure Object Server

In another implementation, the system includes a second cryptographic secure object server (hereinafter the "second server") configured to generate a cryptographic secure object characterized by (e.g., protected at) a second security level (e.g., FIPS 140-2 level 2, FIPS 140-3 level 2) falling below the first security level. In this implementation, the second server generates a cryptographic secure object characterized by the second security level in response to establishing a communication link—with a security device-based on a second connection type (e.g.: a public network connection; an Industrial, Scientific, Medical (or "ISM") network connection).

Additionally, the second server can exclude a hardware security module in which to store cryptographic information. Based on absence of the hardware security module in which to store cryptographic information, the second server may not generate a cryptographic secure object protected at the first security level.

5. Cryptographic Secure Objects

Generally, a security device can execute an authentication process based on identity information associated with the security device.

In one implementation, the security device executes the authentication process based on a cryptographic secure object associated with the security device. More specifically, the security device can execute the authentication process based on a cryptographic secure object—associated with the security device—characterized by the first security level (e.g., FIPS 140-2 level 3, FIPS 140-3 level 3).

In another implementation, another entity (e.g., a second security device, a management server) executes the authentication process based on the cryptographic secure object associated with the security device. More specifically; the security device can transmit the cryptographic secure object-characterized by the first security level—to the other entity; and the other entity can authenticate the security device based on the cryptographic secure object.

In response to executing the authentication process, the security device and/or other entities can execute a set of secure actions, such as executing a secure boot process, installing a configuration file, and/or installing a firmware update, etc.

5.1 Security Levels

Generally, a security device (and/or a computing platform associate with the security device) can be configured to execute a target set of actions based on a security level at which a cryptographic secure object—associated with the security device—is protected.

In one implementation, the security device accesses a policy (or rule(s)) defining: a first set of actions (e.g., authenticate with another entity, install a firmware update, command the computing platform to operate in a nominal operating mode) corresponding to the first security level; a second set of actions (e.g., authenticate with another entity) corresponding to the second security level falling below the first security level; and a third set of actions corresponding to the third security level (e.g., authenticate with another entity, command the computing platform to operate in a degraded operating mode) exceeding the second security level.

In this implementation, the security device: receives a cryptographic secure object protected at a target security level (e.g., the first security level, the second security level, the third security level); and is configured to execute a target set of actions based on the target security level and the policy.

In one example, in response to executing the authentication process based on a cryptographic secure object protected at the first security level, the security device is configured to execute the first set of actions.

In another example, in response to executing the authentication process based on a cryptographic secure object protected at the second security level, the security device is configured to execute the second set of actions.

In another example, in response to executing the authentication process based on a cryptographic secure object protected at the third security level, the security device is configured to execute the third set of actions.

Accordingly, the system can trigger a change in a set of actions (or a "configuration") the security device (and/or the computing platform) is permitted to execute based on the policy and a security level at which a cryptographic secure object associated with the security device is protected.

Therefore, the system can control capabilities of the security device (and/or the computing platform) based on a level of trust in the security device (e.g., according to the security level at which a cryptographic secure object associated with the security device is protected) in order to manage risk and reduce impact of security violations during operation.

6. Level 3 Cryptographic Secure Object

The method S100 includes: generating a first request to generate a first cryptographic secure object characterized by a first security level in Block S102; transmitting the first request to a first server via a first communication link in Block S104; receiving the first cryptographic secure object from the first server, the first cryptographic secure object characterized by a first signature associated with the first server in Block S106; and executing a first action based on the first cryptographic secure object in Block S108.

Generally—in Blocks S102, S104, S106, and S108, and as shown in FIG. 1A—the security device can: establish a communication link with the first server; request a cryptographic secure object, characterized by a first security level (e.g., FIPS 140-2 level 3, FIPS 140-3 level 3), from the first server; and, in response to receiving the cryptographic secure object from the first server, execute an action based on the cryptographic secure object.

Therefore, the system can generate the target cryptographic secure object—associated with the security device and verified by the first server—to establish trust in the security device to engage in secure communication and/or to execute functional safety operations, thereby increasing security and/or safety within an operating field during operation of the computing platform.

6.1 Cryptographic Secure Object Request

In one implementation, the security device establishes a first communication link with the first server based on a first connection type. For example, the security device can establish the first communication link—with the first server—based on a virtual private network. Additionally, the security device can authenticate with the first server based on a first identifier (e.g., a machine identifier) and/or other identity information associated with the security device.

In another implementation, the security device: generates a first request to generate a target cryptographic secure object (e.g., a leaf certificate) characterized by the first security level in Block S102; and transmits the first request to the first server via the first communication link in Block S104. More specifically, the security device can generate the first request including: a first public key associated with the security device; and a first signature based on a first private key corresponding to the first public key.

6.2 Root Cryptographic Secure Object Generation

In another implementation, in Block S120, the first server: generates (or accesses) an asymmetric key pair (e.g., a second public key, a second private key) associated with the first server; and generates a first cryptographic secure object (e.g., a root certificate) characterized by the first security level. For example, the first server can generate the asymmetric key pair and/or the first cryptographic secure object in response to receiving the first request.

In this implementation, the first server generates the first cryptographic secure object specifying: a second identifier associated with the first server; the second public key associated with the first server; and a second signature associated with the first server (e.g., a second signature based on the second private key-corresponding to the second public key—of the first server).

Additionally, the first server can generate the first cryptographic secure object characterized by a first validity period corresponding to a first duration (e.g., one year, ten years, 25 years). The first server can then store the first cryptographic secure object characterized as valid for the first validity period.

6.3 Leaf Cryptographic Secure Object Generation

In another implementation, in response to receiving the first request, the first server: verifies the first request based on the first public key and the first signature included in the first request; and generates the target cryptographic secure object (e.g., a leaf certificate) associated with the security device and characterized by the first security level.

For example, the first server can generate the target cryptographic secure object specifying: the first identifier (e.g., the machine identifier) as the security device; the first public key associated with the security device; the second identifier associated with the first server; and the second signature associated with the first server (e.g., the second signature corresponding to the first cryptographic secure object).

In this implementation, the first server: stores the target cryptographic secure object; and/or transmits the target cryptographic secure object to the security device responsive to the first request.

In another implementation, the security device: receives the target cryptographic secure object from the first server in Block S106; and stores the target cryptographic secure object, such as in the hardware security module of the security device.

Accordingly, the security device and the first server can cooperate: to generate the target cryptographic secure object that associates the first public key with an identity of the security device; and to link the target cryptographic secure object with the first cryptographic secure object. Therefore, the system can enable other entities—exhibiting trust in the first server—to validate the identity of the security device based on the target cryptographic secure object verified by the first server.

6.3 Actions

Generally, the security device can be configured to execute an action—such as the first set of actions, according to a first configuration of the security device, defined by the policy—based on the target cryptographic secure object protected at the first security level.

In one implementation, in response to receiving the target cryptographic secure object from the first server, the security device executes an action based on the target cryptographic secure object characterized by the first security level in Block S108.

In one example, the security device issues a command that causes the computing platform to operate at a nominal operating mode based on a first configuration of the security device according to the first security level (e.g., FIPS 140-2 level 3, FIPS 140-3 level 3) based on the target cryptographic secure object.

In another example, the security device authenticates with a second security device based on the target cryptographic secure object.

6.4 Cryptographic Secure Object Renewal

Figure 1D:
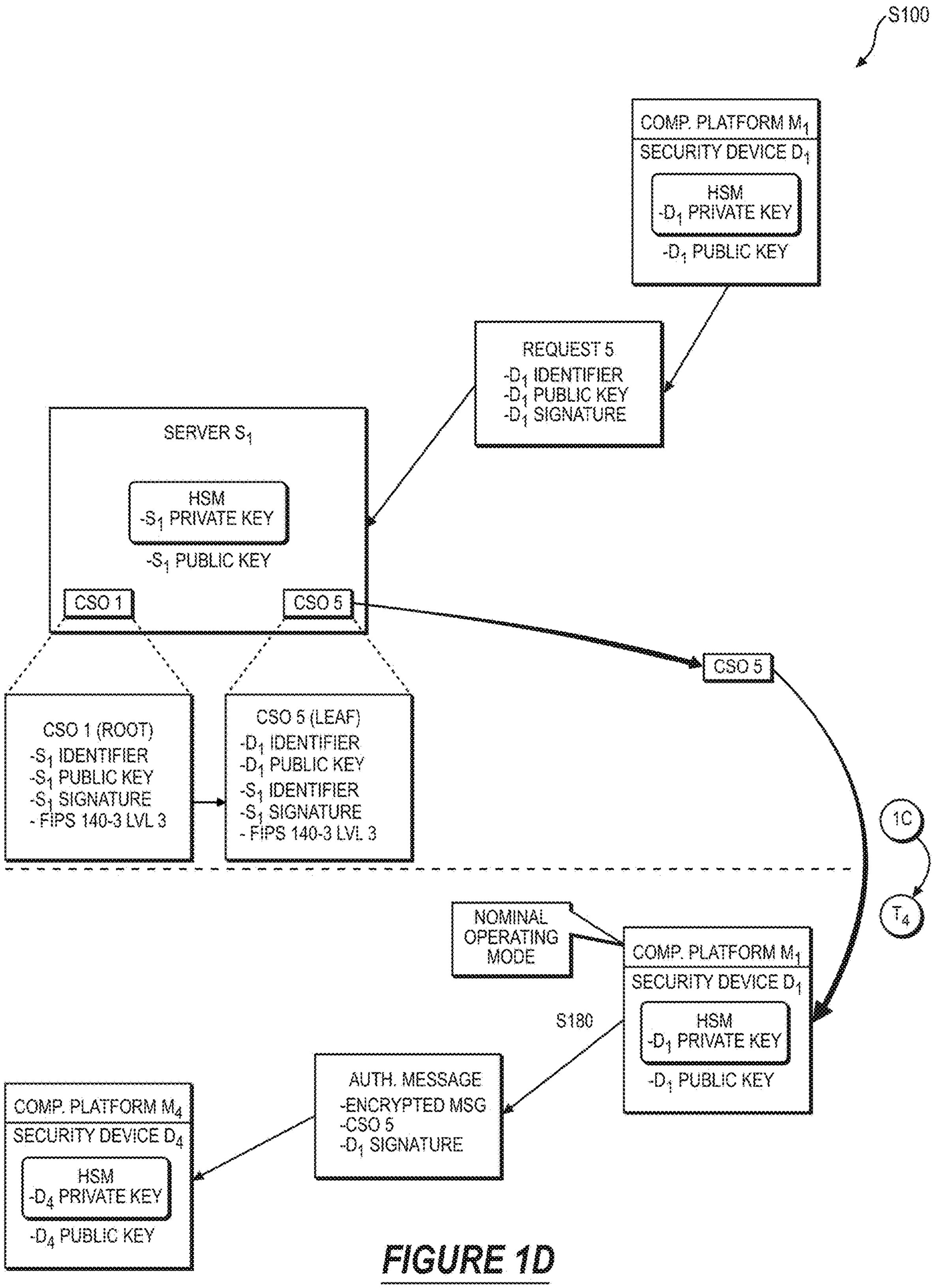

In one implementation, as shown in FIG. 1D, during a time period succeeding the first validity period (e.g., upon expiration of the first duration, upon expiration of the target cryptographic secure object), the security device repeats the foregoing methods and techniques: to generate a second request to generate a second target cryptographic secure object characterized by the first security level; and to transmit the second request to the first server via the first communication link.

In this implementation, in response to receiving the second request, the first server repeats the foregoing methods and techniques: to generate the second target cryptographic secure object associated with the security device and characterized by the first security level; to store the second target cryptographic secure object; and/or to transmit the second target cryptographic secure object to the security device responsive to the second request.

Therefore, the security device and the first server can cooperate to renew a cryptographic secure object-characterized by the first security level-based on communication between the security device and the first server via the first communication link.

7. Hybrid-Level Cryptographic Secure Object

The method S100 includes: generating a second request to generate a second cryptographic secure object characterized by the first security level and to digitally sign a third cryptographic secure object characterized by a second security level falling below the first security level in Block S110; transmitting the second request to the first server via the first communication link in Block S112; generating a third request to generate the third cryptographic secure object associated with the second cryptographic secure object in Block S114; and transmitting the third request to a second server via a second communication link in Block S116.

The method S100 also includes: generating a fourth request to generate a fourth cryptographic secure object based on the third cryptographic secure object in Block S130; transmitting the fourth request to the second server via the second communication link in Block S132; receiving the fourth cryptographic secure object from the second server, the fourth cryptographic secure object in Block S144; and executing a second action based on the fourth cryptographic secure object in Block S108.

Generally—in Blocks S110, S112, S114, and S116, and as shown in FIG. 1B—the system can: establish communication links between the security device, the first server, and the second server; generate a first cryptographic secure object protected at the first security level and digitally signed by the first server; and generate a second cryptographic secure object protected at the second security level and digitally signed by the first server based on the first cryptographic secure object.

Accordingly—in Blocks S130, S132, S144, and S108, and as shown in FIG. 1C—during a time period when a first communication link between the security device and the first server is unavailable, the system can generate a target cryptographic secure object for the security device—based on the second cryptographic secure object digitally signed by the first server based on the first cryptographic secure object—via a second communication link between the security device and the second server in order: to establish a chain of trust extending from the security device to the first server via the second server; and to protect the target cryptographic secure object at a third security level exceeding the second security level.

Therefore, the system can leverage network availability of the second server—characterized by the second security level—with security capability of (and/or trust in) the first server characterized by the first security level in order to generate a chain of cryptographic secure objects based on which the security device may be authenticated, thereby enabling continuous operation of the security device to engage in secure communication and/or to execute functional safety operations on behalf of the computing platform, such as during a period of intermittent connectivity between the security device and the first server.

7.1 Cryptographic Secure Object Requests

In one implementation, the security device executes the foregoing methods and techniques to establish a first communication link (e.g., a first communication link based on a virtual private network) with the first server.

In this implementation, in Block S110, the security device generates a first request: to generate a first cryptographic secure object (e.g., a root certificate) characterized by the first security level; and to digitally sign a second cryptographic secure object (e.g., an intermediate certificate) based on the first cryptographic secure object and characterized by the second security level falling below the first security level. The security device transmits the first request to the first server via the first communication link in Block S112.

In one variation, the security device: generates a first request to generate a first cryptographic secure object characterized by the first security level; generates a separate request to digitally sign the second cryptographic secure object based on the first cryptographic secure object; and transmits the first request and the separate request to the first server via the first communication link.

In another implementation, the security device: establishes a second communication link (e.g., a second communication link based on a public network) with the second server; generates a second request to generate the second cryptographic secure object—characterized by the second security level—associated with the first cryptographic secure object in Block S114; and transmits the second request to the second server via the second communication link in Block S116.

More specifically, the security device can generate the first request (and/or the separate request, the second request) including: a first public key associated with the security device; and a first signature based on a first private key corresponding to the first public key.

7.2 Root Cryptographic Secure Object Generation

In one implementation, in Block S120, the first server executes the foregoing methods and techniques to generate the first cryptographic secure object characterized by the first security level. For example, the first server can: generate (or access) an asymmetric key pair (e.g., a second public key, a second private key) associated with the first server; and generate the first cryptographic secure object characterized by the first security level in response to receiving the first request.

7.2 Intermediate Cryptographic Secure Object Generation

In another implementation, in Block S122, the second server: generates (or accesses) an asymmetric key pair (e.g., a third public key, a third private key) associated with the second server; and generates the second cryptographic secure object characterized by the second security level. For example, the second server can generate the asymmetric key pair and/or the second cryptographic secure object in response to receiving the second request.

More specifically, the second server can generate the second cryptographic secure object specifying: a third identifier associated the second server; the third public key associated with the second server; and the second identifier associated with the first server.

Additionally, the second server can generate the second cryptographic secure object characterized by a second validity period corresponding to a second duration (e.g., one week, one day, one hour, five minutes). The second server can also generate the second cryptographic secure object further characterized by a third validity period (e.g., a grace period) succeeding the second validity period (e.g., in response to expiration of the second validity period) and corresponding to a third duration (e.g., one hour, 24 hours).

7.3 Linking Cryptographic Secure Objects

In one implementation, the second server: establishes a third communication link with the first server based on the first connection; and authenticates with the first server based on the third identifier and/or other identity information associated with the second server.

In another implementation, during the first validity period (e.g., while the first cryptographic secure object is valid) the second server: generates a third request (e.g., a certificate signing request) to sign the second cryptographic secure object based on the first cryptographic secure object in Block S124; and transmits the third request—including the second cryptographic secure object—to the first server via the third communication link in Block S126.

In response to receiving the third request, the first server digitally signs the second cryptographic secure object based on the first cryptographic secure object in Block S128.

More specifically, the first server can update the second cryptographic secure object including the second signature associated with the first server (e.g., the second signature based on the second private key of the first server and/or corresponding to the first cryptographic secure object). The first server can update the second cryptographic secure object—into a second signed cryptographic secure object—specifying: the third identifier associated the second server; the third public key associated with the second server; the second identifier associated with the first server; and the second signature associated with the first server and corresponding to the first cryptographic secure object. The first server can transmit the second signed cryptographic secure object to the second server via the third communication link.

In response to receiving the second signed cryptographic secure object, the second server stores the second signed cryptographic secure object characterized as valid for the second validity period.

Therefore, by generating the second signed cryptographic secure object protected at the second security level and linked to the first cryptographic secure object protected at the first security level, the system can later generate a target cryptographic secure object for the security device based on the second signed cryptographic secure object linked to the first cryptographic secure object, thereby enabling the system to protect the target cryptographic secure object at a "hybrid" security level that exceeds the second security level based on protection of the first cryptographic secure object at the first security level.

7.4 Leaf Cryptographic Secure Object Generation

In one implementation, the security device: generates a third request to generate a target cryptographic secure object (e.g., a leaf certificate) based on the second cryptographic secure object in Block S130; and transmits the third request to the second server via the second communication link in Block S132. For example, the security device can generate and transmit the third request in response to absence of the first communication link with the first server, such as due to intermittent (or absence of) network connectivity between the security device and the first server during deployment of the security device and computing platform to an operating zone (e.g., an industrial mining facility, a lumber harvesting site).

More specifically, the security device can: generate a set of cryptographic keys (e.g., an asymmetric key pair) associated with the security device and including a first public key and a first private key corresponding to the first public key; generate the third request to generate the target cryptographic secure object associated with the first private key, the third request including the first public key and a first signature-associated with the security device-based on the first private key; and store the set of cryptographic keys in a hardware security module of the security device.

In another implementation, in response to receiving the third request, the second server: verifies (or validates) the third request based on the first public key and the first signature included in the third request; and generates the target cryptographic secure object-associated with the security device-based on the first cryptographic secure object and the second cryptographic secure object in Block S140, the target cryptographic secure object characterized by (e.g., protected at) a third security level exceeding the second security level.

More specifically, the second server can generate the target cryptographic secure object based on the second signed cryptographic secure object—protected at the second security level and linked to the first cryptographic secure object protected at the first security level—to protect the target cryptographic secure object at the third security level.

For example, the second server can generate the target cryptographic secure object specifying: the first identifier (e.g., the machine identifier) associated with the security device; the first public key associated with the security device; the third identifier associated with the second server; and the third signature associated with the second server (e.g., the third signature based on the third private key and corresponding to the second cryptographic secure object linked to the first cryptographic secure object).

In this example, the second server can generate the target cryptographic secure object during the second validity period of the second cryptographic secure object. Alternatively, the second server can generate the target cryptographic secure object during the third validity period (i.e., the grace period) of the second cryptographic secure object in response to expiration of the second validity period.

Additionally, the second server can generate the target cryptographic secure object characterized by a fourth validity period corresponding to a fourth duration (e.g., one week, one day, one hour, five minutes). The second server can also generate the target cryptographic secure object further characterized by a fifth validity period (e.g., a grace period) succeeding the fourth validity period (e.g., in response to expiration of the fourth validity period) and corresponding to a fifth duration (e.g., one hour, 24 hours).

In this implementation, the second server: stores the target cryptographic secure object; and/or transmits the target cryptographic secure object to the security device, such as via the second communication link in Block S142.

In another implementation, the security device: receives the target cryptographic secure object from the second server in Block S144; and stores the target cryptographic secure object, such as in the hardware security module of the security device.

Accordingly, when a connection between the security device and the first server is unavailable, the second server can generate the target cryptographic secure object for the security device based on the second cryptographic secure object-protected at the second security level—linked to the first cryptographic secure object protected at the first security level, thereby extending a level of protection and/or a level of trust in the second cryptographic secure object based on the first cryptographic secure object (e.g., based on the first server) in order to protect the target cryptographic secure object at the third security level exceeding the second security level.

Therefore, the system can leverage network availability of the second server with security of (and/or trust in) the first server to generate the target cryptographic secure object based on which an entity—exhibiting trust in the first server—may validate an identity of the security device.

7.4 Actions

Generally, in Block S108, the security device can execute the foregoing methods and techniques to execute an action based on the target cryptographic secure object.

More specifically, the security device can be configured to execute an action—such as the third set of actions, according to a third configuration of the security device, defined by the policy—based on the target cryptographic secure object protected at the third security level.

In one implementation, in response to receiving the target cryptographic secure object characterized by the third security level, the security device issues a command that causes the computing platform to transition from a first operating mode to a second operating mode based on the target cryptographic secure object characterized by the third security level.

For example, the security device can issue a command to the computing platform that causes the computing platform to transition from a nominal operating mode (e.g., a first maximum speed of ten miles per hour) to a degraded operating mode (e.g., a second maximum speed of two miles per hour) based on the target cryptographic secure object protected at the third security level.

In this example, the security device can issue the command that causes the computing platform to operate at the degraded operating mode based on a second configuration of the security device according to the third security level based on the target cryptographic secure object.

In another implementation, the security device: selects a target action in a set of actions based on the target cryptographic secure object (e.g., based on a security level at which the target cryptographic secure object is protected); and executes the target action based on the target cryptographic secure object (and/or the security level).

For example, the security device can select a target action in a set of actions including: a first action including issuing a first command that causes the computing platform to operate at the nominal operating mode based on a first configuration of the security device (or the computing device) according to the first security level; a second action including issuing a second command that causes the computing platform to operate at the degraded operating mode based on a second configuration of the security device (or the computing device) according to the third security level; and a third action including issuing a third command that causes the computing platform to transition to a safe state (e.g., disengage power, disconnect fuel supply) based on a third configuration of the security device (or the computing device) according to the second security level.

More specifically, the first command, the second command, and the third command can be represented by a first bit pattern, a second bit pattern, and a third bit pattern, respectively. The first bit pattern can exhibit a minimum hamming distance (e.g., four, eight) from the second bit pattern and the third bit pattern. Additionally, the second bit pattern can exhibit a minimum hamming distance (e.g., four, eight) from the third bit pattern.

In this example, in response to receiving the target cryptographic secure object characterized by the third security level, the security device can: select the second action in the set of actions; and execute the second action based on the target cryptographic secure object. More specifically, the security device can issue the second command that causes the computing platform to operate at the degraded operating mode based on the second configuration of the security device according to the third security level based on the target cryptographic secure object.

Therefore, the security device can control an operating mode of the computing platform based on a security level at which the target cryptographic security object is protected, thereby reducing risk of damage and/or injury within an operating field during operation of the computing platform.

7.4.1 Risk

In one implementation, the security device accesses a set of actions associated with a task assigned to the computing platform associated with the security device in response to receiving a target cryptographic secure object characterized by a target security level (e.g., the first security level, the second security level falling below the first security level, the third security level exceeding the second security level).

For each action in the set of actions, the security device calculates a risk score—in a set of risk scores—for the action based on the target security level characterizing the target cryptographic secure object (e.g., the target security level at which the target cryptographic secure object is protected).

More specifically, the security device can calculate the risk score based on: the action (e.g., an action type of the action); the task; the target cryptographic secure object (e.g., the target security level at which the target cryptographic secure object is protected); a state of the target cryptographic secure object (e.g., valid, valid within a grace period, expired); a state of the computing device (e.g., based on the target security level); a state of the operating field (e.g., environmental conditions in the operating field and/or proximal the computing device); an impact of a safety hazard associated with the action based on the state of the computing device and/or the state of the operating field; etc.

In this implementation, the security device: selects a target action in the set of actions based on the set of risk scores; and executes the target action.

For example, the security device can: receive a target cryptographic secure object characterized by the third security level; and access a set of actions associated with a task assigned to the computing platform (e.g., an autonomous industrial vehicle). The set of actions can include: a first action including autonomous navigation (e.g., driving) from an extraction site to a collection site at a first maximum speed (e.g., ten miles per hour); and a second action including autonomous navigation from the extraction site to the collection site at a second maximum speed (e.g., five miles per hour).

In this example, the security device can: calculate a first risk score for the first action based on the third security level; calculate a second risk score for the second action based on the third security level, the second risk score falling below the first risk score; select the second action in response to the second risk score falling below a threshold risk score and the first risk score exceeding the threshold risk score; and execute the second action.

Accordingly, the security device can control the computing platform based on a hazard analysis of the task assigned to the computing device and a security level at which the target cryptographic security object is protected, thereby reducing risk of damage and/or injury within the operating field during operation of the computing platform.

7.4.2 Authentication

In one implementation, the security device authenticates with a second security device based on the target cryptographic secure object associated with the security device.

For example, the security device can generate a message including: a set of message data; the target cryptographic secure object—associated with the second cryptographic secure object linked to the first cryptographic secure object—specifying the first public key associated with the security device; and the first signature associated with the security device based on the first private key corresponding to the first public key. The security device can then transmit the message to the second security device.

In response to receiving the message, the second security device can authenticate the security device by: verifying the target cryptographic secure object linked to the second cryptographic secure object and digitally signed by the second server; and verifying the second cryptographic secure object linked to the first cryptographic secure object and digitally signed by the first server.

Additionally, the second security device can authenticate the security device by verifying the message based on the first public key specified in the fourth cryptographic secure object and the first signature included in the message.

The security device can execute the foregoing methods and techniques to authenticate the second security device.

7.5 Intermediate Cryptographic Secure Object Renewal

In one implementation, during a time period succeeding the second validity period of the second cryptographic secure object (e.g., upon expiration of the second duration), the second server repeats the foregoing methods and techniques: to generate a new asymmetric key pair associated with the second server; to generate a new cryptographic secure object (e.g., an intermediate certificate) protected at the second security level; to establish the third communication link with the first server; and to transmit a request (e.g., a certificate signing request)—to sign the new cryptographic secure object based on the first cryptographic secure object—to the first server.

In this implementation, the first server executes the foregoing methods and techniques: to digitally sign the new cryptographic secure object based on the first cryptographic secure object to update the new cryptographic secure object into a new signed cryptographic secure object; and to transmit the new signed cryptographic secure object to the second server.

In response to receiving the new signed cryptographic secure object, the second server can execute the foregoing methods and techniques to generate a target cryptographic secure object (e.g., a leaf certificate): protected at the third security level exceeding the second security level; and linked to the first cryptographic secure object based on the new signed cryptographic secure object.

7.5.1 Intermediate Cryptographic Secure Object Grace Period

In one variation, during the time period succeeding the second validity period (e.g., upon expiration of the second duration) and in response to absence of the third communication link with the first server (e.g., failure to establish the third communication link with the first server), the second server continues storing the second cryptographic secure object characterized as valid for the third validity period (i.e., the grace period) corresponding to the third duration.

In this variation, during the third validity period, the second server periodically attempts to establish the third communication link with the first server. In response to establishing the third communication link with the first server, the first server and the second server can execute the foregoing methods and techniques: to transmit a request (e.g., a certificate signing request)—to sign the new cryptographic secure object based on the first cryptographic secure object—to the first server; to digitally sign the new cryptographic secure object based on the first cryptographic secure object to update the new cryptographic secure object into a new signed cryptographic secure object; and to transmit the new signed cryptographic secure object to the second server.

In response to receiving the new signed cryptographic secure object, the second server can execute the foregoing methods and techniques to generate a target cryptographic secure object (e.g., a leaf certificate): protected at the third security level exceeding the second security level; and linked to the first cryptographic secure object based on the new signed cryptographic secure object.

Therefore, by generating the second cryptographic secure object characterized by the third validity period, the system can avoid disruption to entities and/or other cryptographic secure objects based on expiration of the second cryptographic secure object while the second server attempts to re-establish connection to the first server.

7.6 Leaf Cryptographic Secure Object Renewal and Grace Period

In one implementation, during a time period succeeding the fourth validity period of the target cryptographic secure object (e.g., upon expiration of the fourth duration), the security device repeats the foregoing methods and techniques: to generate a new asymmetric key pair associated with the security device; to establish the second communication link with the second server; and to transmit a request—to generate a new target cryptographic secure object based on the first cryptographic secure object and the second cryptographic secure object—to the second server.

In this implementation, the second server executes the foregoing methods and techniques: to generate the new target cryptographic secure object-based on the first cryptographic secure object and the second cryptographic secure object-protected at the third security level; and to transmit the new target cryptographic secure object to the security device.

In response to receiving the new target cryptographic secure object, the security device executes the foregoing methods and techniques to execute an action based on the new target cryptographic secure object.

In one variation, during the time period succeeding the fourth validity period (e.g., upon expiration of the fourth duration) and in response to absence of the second communication link with the second server (e.g., failure to establish the second communication link with the second server), the security device continues storing the target cryptographic secure object characterized as valid for the fifth validity period (i.e., the grace period) corresponding to the fifth duration. Additionally, the security device can execute an action based on the target cryptographic secure object during the fifth validity period and in response to expiration of the fourth validity period.

In this variation, during the fifth validity period, the security device periodically attempts to establish the second communication link with the second server. In response to establishing the second communication link with the second server, the security device and the second server can execute the foregoing methods and techniques: to transmit a request to generate a new target cryptographic secure object based on the first cryptographic secure object and the second cryptographic secure object to the second server; to generate the new target cryptographic secure object-based on the first cryptographic secure object and the second cryptographic secure object-protected at the third security level; and to transmit the new target cryptographic secure object to the security device.

In response to receiving the new target cryptographic secure object, the security device executes the foregoing methods and techniques to execute an action based on the new target cryptographic secure object.

Therefore, by generating the target cryptographic secure object characterized by the fifth validity period, the system can avoid disruption to entities (e.g., the security device, the computing platform) based on expiration of the target cryptographic secure object while the security device attempts to re-establish connection to the second server.

8. Example

In one example, the system includes the first server, the second server, a computing platform including an autonomous industrial vehicle, and the security device mounted on the autonomous industrial vehicle.

In this example: the second server (e.g., a local server, a zone controller arranged in the operating field and separate from the autonomous vehicle, a zone controller mounted on the autonomous vehicle), the autonomous industrial vehicle, and the security device are deployed in an operating field (e.g., a mining facility); and the first server (e.g., a remote server) is external to the operating field.

8.1 First Time Period: Level 3 Target Cryptographic Secure Object

As shown in FIG. 1A, during a first time period, the security device: establishes a first communication link with the first server; generates a first request to generate a first target cryptographic secure object (e.g., a first leaf certificate) protected at a first security level (e.g., FIPS 140-2 level 3, FIPS 140-3 level 3); and transmits the first request to the first server via the first communication link.

In response to receiving the first request, the first server: generates the first target cryptographic secure object—protected at the first security level—digitally signed by the first server based on a first cryptographic secure object (e.g., a first root certificate) associated with the first server and protected at the first security level; and transmits the first target cryptographic secure object to the security device.

In response to receiving the first target cryptographic secure object, the security device executes a first set of actions based on the first target cryptographic secure object, the first set of actions including: issuing a first command that causes the computing platform to operate at a nominal operating mode based on a first configuration of the security device according to the first security level based on the first target cryptographic secure object; and authenticating with a second security device based on the first target cryptographic secure object.

More specifically, the security device can authenticate with the second security device by: generating a first message including a first set of message data and the first target cryptographic secure object characterized by the first signature associated with the first server; and transmitting the first message to the second security device.

Therefore, the system can: generate the first target cryptographic secure object during the first time period when the first communication link between the security device and the first server is available; and execute actions based on the first target cryptographic secure protected at the first security level.

8.1.1 First Time Period: Level 2 Cryptographic Secure Object

Additionally, as shown in FIG. 1B, during the first time period, the security device: generates a second request to digitally sign a second cryptographic secure object (e.g., an intermediate) protected at a second security level (e.g., FIPS 140-2 level 2, FIPS 140-3 level 2) falling below the first security level; and transmits the second request to the first server via the first communication link.

The security device also: establishes a second communication link with the second server; generates a third request to generate the second cryptographic secure object associated with (e.g., linked to) the first cryptographic secure object; and transmits the third request to the second server via the second communication link.

In this example, the second server: generates the second cryptographic secure object; establishes a third communication link with the first server; generates a fourth request—including the second cryptographic secure object—to digitally sign the second cryptographic secure object based on the first cryptographic secure object; and transmits the fourth request to the first server via the third communication link.

In response to receiving the fourth request, the first server: digitally signs the second cryptographic secure object based on the first cryptographic secure object; and transmits the (signed) second cryptographic secure object to the second server.

Therefore, the second server can later generate a cryptographic secure object based on the second cryptographic secure object protected at the second security level and linked to the first cryptographic secure object protected at the first security level.

8.2 Second Period: Hybrid Level Target Cryptographic Secure Object

As shown in FIG. 1C, during a second time period succeeding the first time period, the security device generates a fifth request to generate a second target cryptographic secure object (e.g., a second leaf object) based on the second cryptographic secure object in response to: expiration of the first target cryptographic secure object; and absence of the first communication link between the security device and the first server (e.g., due to a position of the computing platform and the security device within the operating field during operation). The security device transmits the fifth request to the second server via the second communication link.

In this example, the second server: generates the second target cryptographic secure object—based on the second cryptographic secure object linked to the first cryptographic secure object—protected at a third security level exceeding the second security level; and transmits the second target cryptographic secure object to the security device.

In response to receiving the second target cryptographic secure object, the security device executes a second set of actions based on the second target cryptographic secure object, the second set of actions including: bypassing issuance of the first command that causes the computing platform to operate at the nominal operating mode associated with the first security level; issuing a second command that causes the computing platform to transition from the nominal operating mode to a degraded operating mode based on the second target cryptographic secure object protected at the third security level; and authenticating with a third security device based on the second target cryptographic secure object.

More specifically, the security device can authenticate with the third security device by: generating a second message including a second set of message data and the second target cryptographic secure object associated with the first cryptographic secure object and the second cryptographic secure object; and transmitting the second message to the third security device.

Therefore, the system can: generate the second target cryptographic secure object during the second time period when the first communication link between the security device and the first server is unavailable; and execute actions based on the second target cryptographic secure protected at the third security level.

8.3 Third Period: Level 3 Target Cryptographic Secure Object

As shown in FIG. 1D, during a third time period succeeding the second time period, the security device: re-establishes the first communication link with the first server; generates a sixth request to generate a third target cryptographic secure object (e.g., a third leaf certificate) protected at the first security level; and transmits the sixth request to the first server via the first communication link.

In response to receiving the sixth request, the first server: generates the third target cryptographic secure object digitally signed by the first server based on the first cryptographic secure object and protected at the first security level; and transmits the third target cryptographic secure object to the security object.

In response to receiving the third target cryptographic secure object, the security device executes a third set of actions based on the third target cryptographic secure object, the third set of actions including issuing a third command that causes the computing platform to transition from the degraded operating mode to the nominal operating mode based on the third target cryptographic secure object protected at the third security level.

Therefore, the system can: generate the third target cryptographic secure object during the third time period when the first communication link between the security device and the first server is available; and execute actions based on the third target cryptographic secure protected at the first security level.

9. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising, at a security device associated with a platform:

during a first time period:

generating a first request to generate a first digital certificate protected at a first security level;

transmitting the first request to a first server via a first communication link;

receiving the first digital certificate from the first server, the first digital certificate characterized by a first signature associated with the first server; and executing a first action comprising issuing a first command that causes the platform to operate at a first operating mode corresponding to the first security level at which the first digital certificate is protected;

during a second time period:

generating a second request to generate a second digital certificate protected at the first security level; and to digitally sign a third digital certificate protected at a second security level falling below the first security level;

transmitting the second request to the first server via the first communication link;

generating a third request to generate the third digital certificate associated with the second digital certificate; and transmitting the third request to a second server via a second communication link; and during a third time period succeeding the second time period:

generating a fourth request to generate a fourth digital certificate based on the third digital certificate;

transmitting the fourth request to the second server via the second communication link;

receiving the fourth digital certificate from the second server, the fourth digital certificate:

generated by the second server based on:

the second digital certificate:

generated by the first server; and protected at the first security level; and the third digital certificate:

generated by the second server;

digitally signed by the first server; and protected at the second security level; and protected at a third security level exceeding the second security level;

calculating a first risk score for the first action based on the third security level;

calculating a second risk score for a second action comprising issuing a second command that causes the platform to transition from the first operating mode to a second operating mode corresponding to the third security level at which the fourth digital certificate is protected; and executing the second action in response to:

the first risk score exceeding a threshold risk score;

and the second risk score falling below the threshold risk score.

2. The method of claim 1:

further comprising, during a fourth time period succeeding the third time period:

generating a fourth request to generate a fifth digital certificate protected at the first security level;

transmitting the fourth request to the first server via the first communication link; and in response to receiving the fifth digital certificate from the first server, issuing a third command that causes the platform to transition from the second operating mode to the first operating mode corresponding to the first security level at which the fifth digital certificate is protected.

3. The method of claim 1:

wherein generating the fourth request comprises generating the fourth request in response to absence of the first communication link; and wherein executing the second action comprises:

bypassing the first action in response to expiration of the first digital certificate; and executing the second action based on the fourth digital certificate.

4. The method of claim 1:

wherein transmitting the first request comprises transmitting the first request to the first server via the first communication link based on a virtual private network; and wherein transmitting the second request comprises transmitting the second request to the second server via the second communication link based on a public network in response to absence of the first communication link.

5. The method of claim 1:

wherein executing the first action comprises issuing the first command that causes the platform to operate at a nominal operating mode based on a first configuration of the security device according to the first security level at which the first digital certificate is protected; and wherein executing the second action comprises issuing the second command that causes the platform to operate at a degraded operating mode based on a second configuration of the security device according to the third security level at which the fourth digital certificate is protected.

6. The method of claim 5, wherein executing the second action comprises selecting the second action in a set of actions comprising:

the first action;

the second action; and a third action comprising issuing a third command that causes the platform to transition to a safe state based on a third configuration of the security device corresponding to the second security level.

7. The method of claim 1:

wherein executing the first action comprises authenticating with a second security device based on the first digital certificate by:

generating a first message comprising the first digital certificate characterized by the first signature associated with the first server; and transmitting the first message to the second security device; and wherein executing the second action comprises authenticating with a third security device based on the fourth digital certificate by:

generating a second message comprising the fourth digital certificate associated with the second digital certificate and the third digital certificate; and transmitting the second message to the third security device.

8. The method of claim 1, wherein executing the second action comprises:

accessing a set of actions associated with a task assigned to the platform associated with the security device, the set of actions comprising the first action and the second action;

selecting the second action from the set of actions in response to the second risk score falling below the threshold risk score and the first risk score exceeding the threshold risk score; and executing the second action.

9. The method of claim 1, wherein generating the fourth request comprises:

generating a set of cryptographic keys associated with the security device and including a public key and a private key;

generating the fourth request to generate the fourth digital certificate associated with the public key; and storing the private key in a hardware security module of the security device.

10. The method of claim 1, wherein receiving the fourth digital certificate comprises receiving the fourth digital certificate specifying:

a first identifier associated with the first server;

the first signature associated with the first server based on the second digital certificate;

a second identifier associated with the second server; and a second signature associated with the second server based on the third digital certificate.

11. The method of claim 1, further comprising, at the second server:

generating the third digital certificate protected at the second security level;

generating a fifth request to digitally sign the third digital certificate based on the second digital certificate, the fifth request comprising the third digital certificate;

transmitting the fifth request to the first server via a third communication link; and generating the fourth digital certificate based on the third digital certificate in response to receiving the third digital certificate characterized by the first signature associated with the first server and based on the second digital certificate.

12. The method of claim 11:

wherein generating the third digital certificate comprises generating the third digital certificate specifying:

a first validity period characterized by a first duration; and a second validity period succeeding the first validity period and characterized by a second duration; and wherein generating the fourth digital certificate comprises generating the fourth digital certificate based on the third digital certificate during the second validity period and in response to expiration of the first duration.

13. The method of claim 11:

wherein generating the fourth digital certificate comprises generating the fourth digital certificate specifying:

a first validity period characterized by a first duration; and a second validity period succeeding the first validity period and characterized by a second duration; and wherein executing the second action comprises executing the second action based on the fourth digital certificate during the second validity period and in response to expiration of the first duration.

14. The method of claim 11:

wherein generating the fourth request comprises generating the fourth request comprising:

a public key associated with the security device; and a second signature based on a private key corresponding to the public key; and wherein generating the fourth digital certificate comprises generating the fourth digital certificate in response to validating the fourth request based on the public key and the second signature.

15. The method of claim 1, further comprising, at the first server:

generating the second digital certificate protected at the first security level; and digitally signing the third digital certificate based on the second digital certificate.

16. A method comprising:

at a security device, associated with a platform, during a first time period:

generating a first request:

to generate a first digital certificate protected at a first security level; and to digitally sign a second digital certificate protected at a second security level falling below the first security level;

transmitting the first request to a first server via a first communication link;

generating a second request to generate the second digital certificate associated with the first digital certificate; and transmitting the second request to a second server via a second communication link;

at the second server during the first time period:

generating the second digital certificate protected at the second security level;

generating a third request to digitally sign the second digital certificate based on the first digital certificate; and transmitting the third request to the first server via a third communication link; and at the security device during a second time period succeeding the first time period:

generating a fourth request to generate a third digital certificate based on the second digital certificate;

transmitting the fourth request to the second server via the second communication link;

receiving the third digital certificate from the second server, the third digital certificate cryptographic secure object:

generated by the second server based on the first digital certificate generated by the first server; and the second digital certificate digitally signed by the first server; and protected at a third security level exceeding the second security level; and accessing a set of actions associated with a task assigned to the platform, the set of actions comprising:

a first action comprising issuing a first command that causes the platform to operate at a first operating mode based on the third security level at which the third digital certificate is protected; and a second action comprising issuing a second command that causes the platform to operate at a second operating mode based on the third security level at which the third digital certificate is protected;

calculating a first risk score for the first action;

calculating a second risk score for the second action;

selecting the second action from the set of actions in response to the first risk score exceeding a threshold risk score and the second risk score falling below the threshold risk score; and executing the second action based on the third digital certificate.

17. The method of claim 16:

wherein generating the fourth request comprises generating the fourth request in response to absence of the first communication link; and wherein executing the second action comprises:

bypassing the first action; and executing the second action associated with the third security level.

18. The method of claim 17:

wherein bypassing the first action comprises bypassing the first action comprising issuing the first command that causes the platform to operate at a nominal operating mode; and wherein executing the second action comprises executing the second action comprising issuing the second command that causes the platform to operate at a degraded operating mode corresponding to the third security level.

19. The method of claim 16, further comprising, at the second server during the second time period, generating the third digital certificate based on the second digital certificate in response to receiving the second digital certificate characterized by a signature associated with the first server and based on the first digital certificate.

20. A method comprising, at a security device associated with a platform:

during a first time period:

generating a first request:

to generate a first digital certificate protected at a first security level; and to digitally sign a second digital certificate protected at a second security level falling below the first security level;

transmitting the first request to a first server via a first communication link;

generating a second request to generate the second digital certificate associated with the first digital certificate; and transmitting the second request to a second server via a second communication link; and during a second time period succeeding the first time period:

in response to absence of the first communication link, generating a third request to generate a third digital certificate based on the second digital certificate generated by the second server;

transmitting the third request to the second server via the second communication link;

receiving the third digital certificate from the second server, the third digital certificate:

generated by the second server based on:

the first digital certificate generated by the first server; and the second digital certificate digitally signed by the first server; and protected at a third security level exceeding the second security level;

calculating a risk score for an action comprising issuing a command that causes the platform to operate at a degraded operating mode, in a set of operating modes, corresponding to the third security level at which the third digital certificate is protected, the set of operating modes comprising:

a nominal operating mode corresponding to the first security level;

the degraded operating mode corresponding to the third security level; and a safe state corresponding to the second security level; and executing the action in response to the risk score falling below a threshold risk score.

* * * * *